US010469617B1

(12) United States Patent
Mahapatra

(10) Patent No.: US 10,469,617 B1
(45) Date of Patent: Nov. 5, 2019

(54) SYSTEM AND METHOD FOR EFFICIENT NETWORK USAGE

(71) Applicant: AMAZON TECHNOLOGIES, INC., Seattle, WA (US)

(72) Inventor: Abinash Mahapatra, Cupertino, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 181 days.

(21) Appl. No.: 15/710,569

(22) Filed: Sep. 20, 2017

(51) Int. Cl.
*G06F 15/173* (2006.01)
*H04L 29/08* (2006.01)
*H04L 12/26* (2006.01)
*G06F 1/3234* (2019.01)

(52) U.S. Cl.
CPC .......... *H04L 67/325* (2013.01); *G06F 1/3234* (2013.01); *H04L 43/0888* (2013.01)

(58) Field of Classification Search
CPC .. H04L 67/325; H04L 43/0888; G06F 1/3234
USPC ................................................ 709/223, 224
See application file for complete search history.

(56) References Cited

U.S. PATENT DOCUMENTS

| | | | | |
|---|---|---|---|---|
| 2013/0304758 | A1* | 11/2013 | Gruber | G06F 16/9535 707/769 |
| 2014/0279780 | A1* | 9/2014 | Dasgupta | G06N 5/02 706/46 |
| 2015/0103738 | A1* | 4/2015 | Venkatraman | H04W 48/20 370/328 |
| 2015/0178134 | A1* | 6/2015 | Dai | G06Q 10/0631 718/104 |
| 2015/0310347 | A1* | 10/2015 | Mukherji | H04L 67/10 706/51 |
| 2016/0132161 | A1* | 5/2016 | Kalb | G06F 3/048 463/31 |
| 2017/0017734 | A1* | 1/2017 | Groh | G06F 17/5009 |
| 2018/0307687 | A1* | 10/2018 | Natkin | H04L 67/22 |

* cited by examiner

*Primary Examiner* — Philip B Tran
(74) *Attorney, Agent, or Firm* — Lindauer Law, PLLC

(57) ABSTRACT

A user device may receive network application requests from multiple applications, such as a music application, news application, and social media application. The user device may send to a server for crowdsource data. The crowdsource data may be based on response data received from other user devices. The response data may indicate the location of the user device, type of application seeking to send a network application request, the response time to receive a network response, a network, and so forth. The server may filter the crowdsource data to correspond to the location of the user device, the applications seeking to send a network application request, and the network the user device is currently using. The user device based on estimated response times may determine a prioritization order in which to send the network application requests.

20 Claims, 11 Drawing Sheets

CROWDSOURCE MODULE 202

| URI 206 | LOCATION 208 | NETWORK 210 | RESPONSE TIME 212 | TOTAL CHANNEL THROUGHPUT 214 | APPLICATION 216 | USER DEVICE TYPE 218 |
|---|---|---|---|---|---|---|
| EXAMPLE1.COM | SEATTLE | 4G | 5 SECONDS | 7 BITS/s | APPLICATION #1 | DEVICE TYPE #1 |
| EXAMPLE1.COM | SEATTLE | WiFi | 2 SECONDS | 10 BITS/s | APPLICATION #1 | DEVICE TYPE #1 |
| GETPAGE.HTML | SEATTLE | 4G | 1 SECOND | 7 BITS/s | APPLICATION #2 | DEVICE TYPE #1 |
| EXAMPLE2.COM | SEATTLE | 4G | 7 SECONDS | 7 BITS/s | APPLICATION #3 | DEVICE TYPE #1 |
| EXAMPLE2.COM | SEATTLE | WiFi | 10 SECONDS | 10 BITS/s | APPLICATION #3 | DEVICE TYPE #1 |

CROWDSOURCE DATA 204

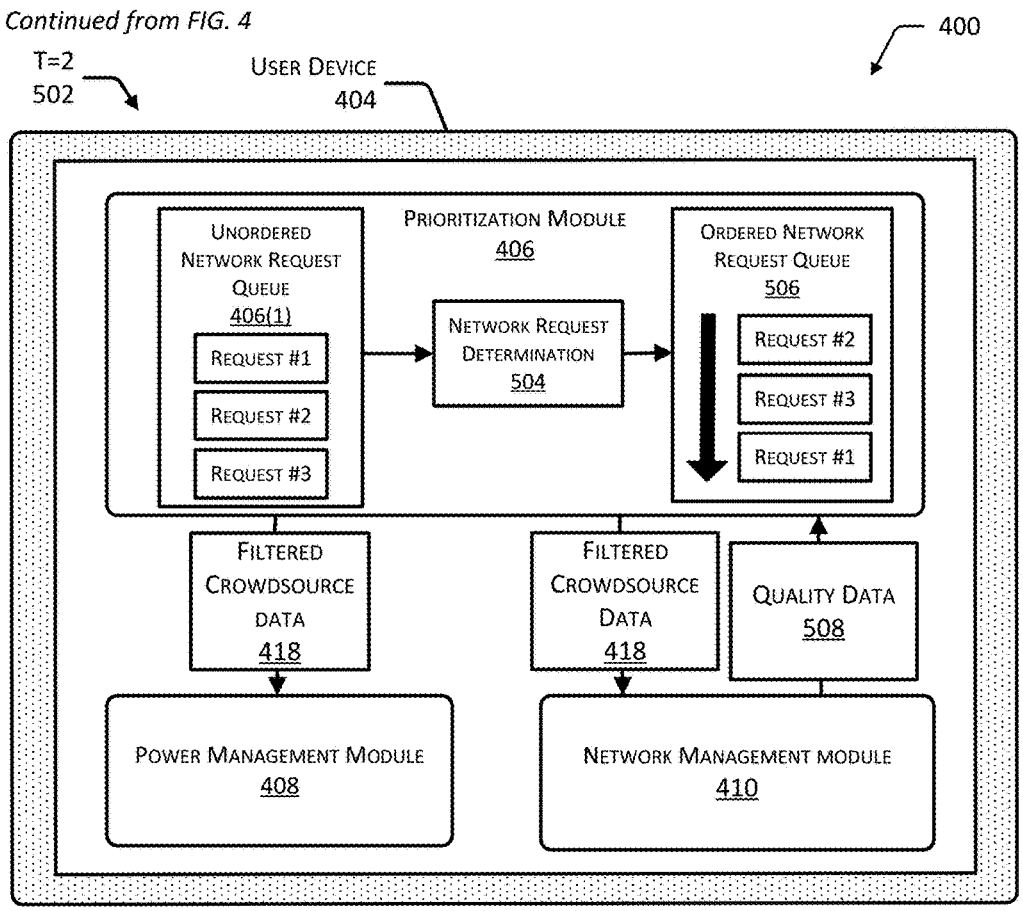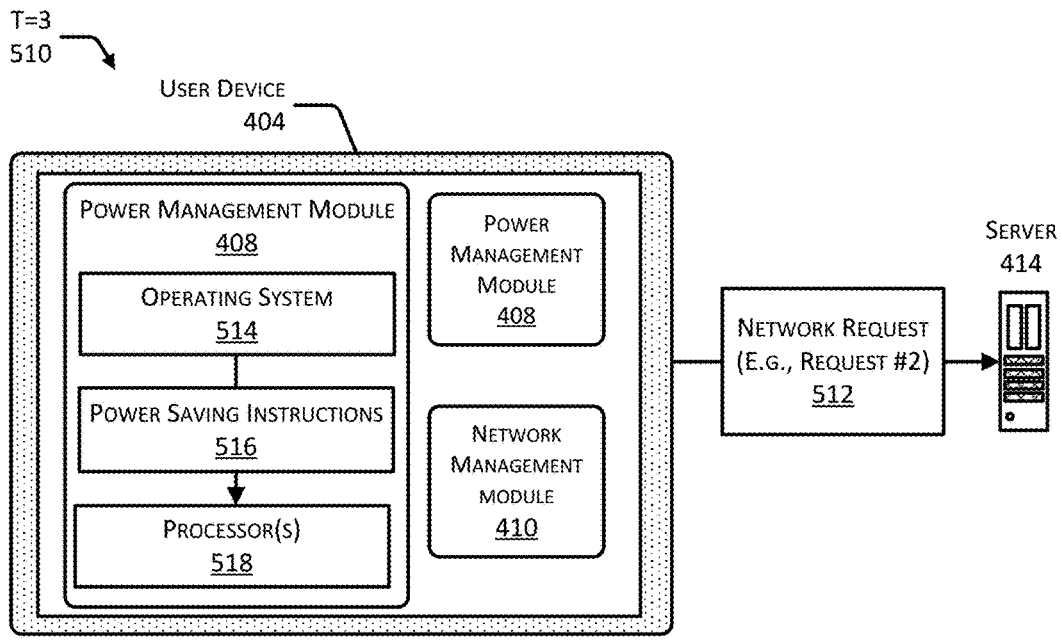
FIG. 5

SYSTEM AND METHOD FOR EFFICIENT NETWORK USAGE

BACKGROUND

Internet connectivity has become central to many daily activities. For example, millions of people worldwide use mobile applications for various bill pay and banking functionalities. Countless more people use the mobile applications for shopping, entertainment, to obtain news, and for a myriad of other purposes. However, a large amount of network traffic that is communicated by the mobile applications is relatively unimportant or not time critical. Thus, whether a network request for a particular mobile application is delivered instantaneously or delayed by an hour often does not make a difference.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 is an example of crowdsource data that indicates a network response time for particular parameters.

FIGS. 4-6 are an example of an environment for efficient network usage.

Figure 1:
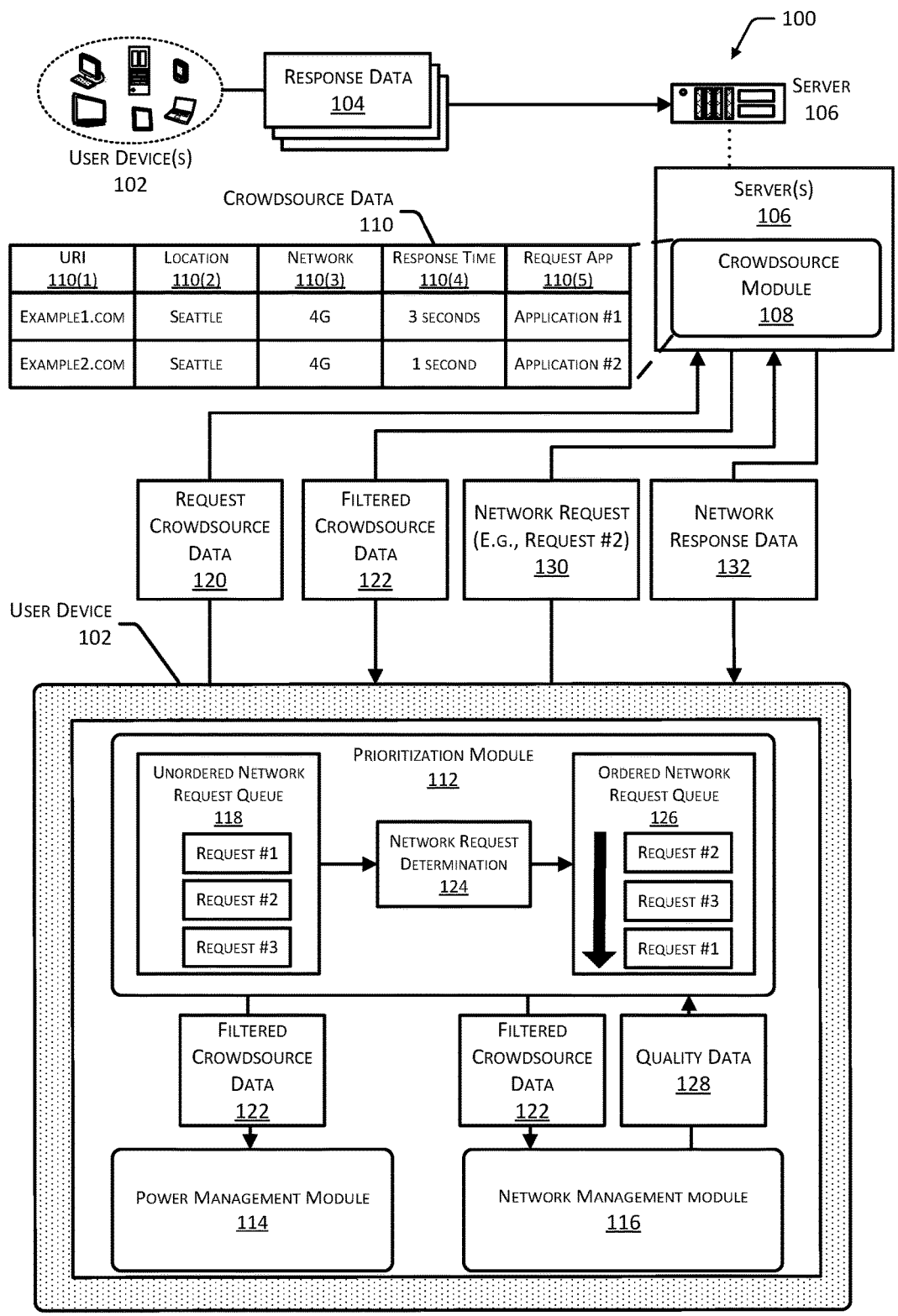
FIG. 1 depicts a schematic of a system for efficient network usage.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

User devices may have more than one application running at a given time. An operating system (OS) of the user device has the challenge of prioritizing network requests for each of the applications. For example, the user device may be operating a music application, an electronic mail (email) application, and a navigation application. Each of these applications may provide a network request to the OS. Each of these applications may provide an indication that their network request is of high priority. However, the OS does not know whether each of the network requests are actually of high priority and thus may not be able to determine an order to send the network requests. Since, the OS is not able to determine an order to send the network requests as each of the requests are indicated as high priority this may lead to unnecessary long response times for each of the network responses, which leads to a poor user experience.

While performing functions for the application, a processor of the user device may operate in a normal power mode, such as operating at a relatively high clock speed. However, the processor may remain in this normal power mode even while idle and waiting for a network response after sending a request. This idle time in normal power mode uses power from the battery, reducing runtime between charges, increasing temperature of the user device, and so forth.

Applications may make the optimistic assumption that when the user device is connected to a network the maximum total channel throughput is available. The user devices may attempt to download images or videos at a high resolution even though the available total channel throughput is insufficient to ensure timely delivery. By attempting to download images and videos at a higher resolution, the user may experience long download times, leading to a poor user experience, increased power consumption, and so forth.

This disclosure describes systems and methods for efficient network usage. The system may include user devices and a server. The user devices may be configured to send response data to the server after the user devices have received a network response. The response data may include information about the user devices' interaction with an external device, such as a web server. The information may include the amount of time between sending a network request to the web server and receiving a network response from the web server. For example, the amount of time between a network request and a network response may be five (5) seconds for a particular application.

The server may generate crowdsource data based on the response data. The crowdsource data may be used by the user devices to prioritize the order in which network requests are sent. For example, the user device may be operating a music application, a news application, and a social media application. Each of these applications may provide a network request to the OS with each of these requests indicating a high priority. The user device may send a crowdsource data request to the server, which includes one or more parameters. The one or more parameters may include a location of the user device, a network, applications seeking to send a network request, and so forth. For example, the one or more parameters may indicate that the user device is located in Seattle, using a Wi-Fi network, and has a music, news, and social media application seeking to send a network request. The server may filter the crowdsource data to correspond to the one or more parameters and send the filtered crowdsource data along with estimated network response times to the user device. For example, the server may filter the crowdsource data to include data of similar user devices located in Seattle, using a Wi-Fi network, and network response times associated with the music, news, and social media applications.

The user device upon receipt of the filtered crowdsource data may determine the prioritization of the network requests for the applications seeking to send a network request. For example, the filtered crowdsource data may indicate that similar user devices that are in Seattle and using Wi-Fi networks may have an estimated network response time of one (1) second for the music application, ten (10) seconds for the news application, and two (2) seconds for the social media application. Based on the estimated network response times, the user device may prioritize that the music application network request be sent first, then the social media application network request, and then the news application network request.

In another example, the filtered crowdsource data may also include other networks and estimated network response times for the other networks. For example, the filtered crowdsource data may indicate that similar user devices, in Seattle, on a Wi-Fi network may have an estimated network response time of five (5) seconds for the music application, ten (10) seconds for the news application, and three (3) seconds for the social media application. The filtered crowdsource data may also indicate that similar user devices, in Seattle on a fourth generation of wireless mobile telecommunications technology (4G) network may have an estimated network response time of six (6) seconds for the music application, twenty (20) seconds for the news application, and two (2) seconds for the social media application. Based on the estimated network response times, the user device may switch to the 4G network and prioritize the social media network request first, then switch to the Wi-Fi network and prioritize the music application network request second, and then prioritize the news application network request third.

In yet another example, the filtered crowdsource data may also include total channel throughput associated with a network. For example, the filtered crowdsource data may indicate that the total channel throughput for the Wi-Fi network is insufficient to download high resolution images and videos. The user device in response to receiving a network response may download a lower resolution of images and videos. In another example, the filtered crowdsource data may indicate that the maximum total channel throughput for the Wi-Fi network is available. In this example, the user device may download high resolution of the images and videos.

While performing functions for the application, a processor of the user device may transition from a first power mode to a second power mode. The second power mode may consume less power than the first power mode. For example, as described above, the user device may receive filtered crowdsource data which indicates that similar user devices, in Seattle, on a Wi-Fi network may have an estimated network response time of five (5) seconds for the music application, ten (10) seconds for the news application, and three (3) seconds for the social media application. The user device may determine that for each of these network requests the processor of the user device may transition from the first power mode to the second power mode. This enables the user device to use less power from the battery, reduce runtime between charges, decrease temperature of the user device, and so forth.

By using the techniques and systems described above, user experience is improved as the user device may prioritize the network application requests that have the shortest estimated network response time to a network request to be sent first. By prioritizing the network application requests the user device is enabled to reduce computational load requirements, reduces network bandwidth, reduces memory allocation, and so forth. By transitioning from a first power mode to a second power mode the user device may use less power from the battery, reduce runtime between charges, decrease temperature of the user device, and so forth. By determining an estimated total channel throughput for a network, the user device may be enabled to download images and videos at a resolution, that leads to shorter download times for the network responses, which leads to an improved user experience, and reduces consumption of user device resources, such as the battery.

Illustrative System

FIG. 1 depicts a schematic of a system 100 for efficient network usage. The system 100 may include a user device(s) 102 that includes a touchscreen, mouse, or other input device as well as a display device to present a user interface. The user device 102 may be a television, tablet computer, personal computer, electronic book reader, gaming console, set-top box, media player, in-vehicle entertainment system, smartphone, server, device control system, a voice activated device, and so forth. The user device 102 may utilize automated speech recognition or other techniques to receive and analyze audible user inputs.

The user device 102 may couple to one or more networks (not shown). The networks may include public networks, private networks, or a combination thereof. The networks may include, but are not limited to personal area networks (PANs), local area networks (LANs), wide area networks (WANs), and so forth. The networks may communicate using Ethernet, Wi-Fi, Bluetooth, ZigBee, 4G, LTE, or other technologies.

In one implementation, the user device 102 may send response data 104 to a server 106. The response data 104 may also include one or more of a uniform resource identifier information (URI), location information, network information, application information, network response time information, total channel throughput information, user device information, and so forth. The URI information may be indicative of an address to a resource on the internet, a Hypertext Transfer Protocol (HTTP) command, and so forth. For example, the URI information may be www.example1.com. The location information may describe a location of the user device 102 from where a network request occurred. For example, the location information may describe that the user device 102 may be in Seattle. In other examples, the location information may describe latitude, longitude, altitude, street address, zip code, state, county, building, floor, and so forth. The network information may be indicative of a wireless telecommunication technology. For example, the wireless telecommunication technology may include a wireless cellular data network (WCDN), fourth generation of wireless mobile telecommunications technology (4G), third generation of wireless mobile telecommunications technology (3G), Wi-Fi, and so forth. The network response time information may be indicative of a response time associated with a network application request. For example, the network response time associated with a network application request for a music application may be two (2) seconds. The total channel throughput information may be indicative of an amount of data being transmitted in a fixed amount of time associated with the network information and the location information. For example, the total channel throughput information may be 7 bits per second (bits/s). In other examples, the total channel throughput information may indicate high, medium, and low, or great, average, and poor. The application information may be indicative of a type of software that is configured to enable a user device to execute one or more tasks. For example, the application information may indicate a mobile application, software program, or web service seeking to send a network request. The user device information may be indicative of a type of user device 102. For example, the user device information may indicate that the user device 102 is a particular smartphone.

The server 106 may be configured to include a crowdsource module 108. The crowdsource module 108 may be configured to in response to receiving the response data 104, generate crowdsource data 110. The crowdsource data 110 may be based on the response data 104. For example, the crowdsource data 110 may include a URI 110(1), a location 110(2), a network 110(3), a response time 110(4), a request application 110(5), and so forth. The URI 110(1) may indicate URI information, as described above. The location 110(2) may indicate location information, as described above. The network 110(3) may indicate network information, as described above. The response time 110(4) may be network response time information, as described above. The request application 110(5) may indicate application information, as described above.

In one implementation, the user device 102 may be configured to include a prioritization module 112, a power management module 114, a network management module 116, and so forth. The prioritization module 112 may be configured to include an unordered network request queue 118. The unordered network request queue 118 may indicate a number of network requests from a number of applications or web page requests. For example, the user device 102 may be operating a music application, a news application, and a social media application. Each of these applications may provide a network request to an operating system (OS) with each of these requests indicating a high priority. The user device 102 may place each of the network requests in the unordered network request queue 118 as the user device 102 determines a prioritization order. The user device 102 may send a request crowdsource data 120 request to the server 106. The request crowdsource data 120 may include one or more parameters. The one or more parameters may include a location of the user device 102, a network, applications seeking to send a network request, and so forth. For example, the one or more parameters may indicate that the user device 102 is located in Seattle, using a 4G network, and has a music, news, and social media application seeking to send a network request.

The server 106 may be configured to receive the request crowdsource data 120. The crowdsource module 108 may be configured to determine filtered crowdsource data 122 to include at least crowdsource data 110 associated with the applications that have the pending network request and the one or more parameters associated with the user device 102. For example, the crowdsource module 108 may filter the crowdsource data 110 to include data of similar user devices located in Seattle, using a 4G network, and network response times associated with the music, news, and social media applications. The server 106 may send the filtered crowdsource data 122 to the user device 102.

In another implementation, the server 106 may filter the crowdsource data 110 to include data of other networks and estimated network response times for the other networks. For example, the crowdsource module 108 may filter the crowdsource data 110 to include data of similar user devices located in Seattle, using a 3G, 4G, Wi-Fi network, and network response times associated with the music, news, and social media applications for each of the networks. The server 106 may send the filtered crowdsource data 122 to the user device 102.

The user device 102 in response to the filtered crowdsource data 122 may be configured to include a network request determination 124. The network request determination 124 may be configured to determine a prioritized order to send the network requests stored in the unordered network request queue 118. The network request determination 124 may determine an estimated network response time for each of the network application requests based on the filtered crowdsource data 122. For example, the network request determination 124 may access the filtered crowdsource data 122. The filtered crowdsource data 122 may indicate that similar user devices that are in Seattle and using 4G networks may have an estimated network response time of one (1) second for the music application, ten (10) seconds for the news application, and two (2) seconds for the social media application. Based on the estimated network response times, the network request determination 124 may prioritize that the music application network request be sent first, then the social media application network request, and then the news application network request.

In another implementation, the network request determination 124 may be configured to determine the prioritized order by averaging the estimated response times included in the filtered crowdsource data 122. For example, the network request determination 124 may access the filtered crowdsource data 122. The filtered crowdsource data 122 may indicate that similar user devices that are in Seattle and using 4G networks may have an estimated network response time of one (1) second, three (3) seconds, and one (1) second for the music application, ten (10) seconds, fifteen (15) seconds, and twelve (12) seconds for the news application, and two (2) seconds, three seconds (3), and four (4) seconds, for the social media application. The network request determination 124 may determine that the average estimated response time for the music application is 1.67 seconds, for the news application is 12.33 seconds, and for the social media application is 3 seconds. Based on the estimated network response times, the network request determination 124 may prioritize that the music application network request be sent first, then the social media application network request, and then the news application network request.

In other implementations, each of the network application requests may be a URI from web sites to a web service. For example, for the user device 102 the URIs associated with the websites seeking a network request may be www.example1.com, www.example2.com, www.example3.com, and so forth. In other examples, the URI associated with the websites may be a Hypertext Transfer Protocol (HTTP) command, such as getpage.html. The server 106 may be configured to determine the filtered crowdsource data 122 to include at least crowdsource data 110 associated with the web service and websites seeking to send a network request. For example, the crowdsource module 108 may filter the crowdsource data 110 to include data of similar user devices located in Seattle, using a 4G network, and network response times associated with www.example1.com, www.example2.com, www.example3.com. The server 106 may send the filtered crowdsource data 122 to the user device 102. The network request determination 124 may determine the prioritized order to send the network application requests associated with the web sites, as described above.

In one implementation, the prioritization module 112 may be configured to include an ordered network request queue 126. The ordered network request queue 126 may indicate the determined prioritized order to send the network application requests to the server 106. For example, the filtered crowdsource data 122 may indicate that similar user devices that are in Seattle and using 4G networks may have an estimated network response time of one (1) second for the music application, ten (10) seconds for the news application, and two (2) seconds for the social media application. Based on the estimated network response times, the network request determination 124 may determine that the music application network request be sent first, then the social media application network request, and then the news application network request. The network request determination 124 may send the determined prioritized order to the ordered network request queue 126. The ordered network request queue 126 may store the determined prioritized order. Continuing the above example, the ordered network request queue 126 may store the music application network request first, the social media application network request second, and the news application network request third. The user device 102 may be configured to send the network applications requests in the order that they are stored in the ordered network request queue 126. For example, the user device 102 may send the music application network request first. The user device 102 may send the social media application request in response to receiving the network response associated with the music application, and so forth.

In another implementation, the prioritization module 112 may send the filtered crowdsource data 122 to the power management module 114. The power management module 114 may be configured to transition one or more components of the user device 102 from a first power mode to a second power mode. The second power mode may consume less battery power than the first power mode. The one or more components that the power management module 114 may transition from the first power mode to the second power mode may be a processor, display, radio, Bluetooth, global positioning system (GPS), microphone, camera, and so forth. For example, as described above, the user device 102 may receive the filtered crowdsource data 122 which indicates that similar user devices, in Seattle, on a Wi-Fi network may have an estimated network response time of five (5) seconds for the music application, ten (10) seconds for the news application, and three (3) seconds for the social media application. The power management module 114 may determine that for each of these network requests the processor of the user device 102 may transition from the first power mode to the second power mode. This enables the user device 102 to use less power from the battery, reduce runtime between charges, decrease temperature of the user device 102, and so forth.

In another example, the user device 102 may receive the filtered crowdsource data 122 which indicates that similar user devices, in Seattle, on a Wi-Fi network may have an estimated network response time of one (1) second for the music application, ten (10) seconds for the news application, and three (3) seconds for the social media application. The power management module 114 may determine that transitioning from the first power mode to the second power mode for the music network application request may use more power than staying at the first power mode. In this example, the power management module 114 may not transition the processor from the first power mode to the second power mode for the music network application request but transition the processor from the first power mode to the second power mode for the social media network application request and the news network application request.

In other implementations, the prioritization module 112 may send the crowdsource data 122 to the network management module 116. The network management module 116 may determine an estimated total channel throughput. The estimated total channel throughput may be used to determine a resolution to download one or more elements associated with the application or web service. The network management module 116 may determine the estimated total channel throughput by measuring traffic data indicative of total channel throughput for a network that the user device 102 is using. For example, the user device 102 may be using a Wi-Fi network. The network management module 116 may measure the total channel throughput of the Wi-Fi network. The network management module 116 may apply a first weight value to the traffic data to determine a first measurement. The network management module 116 may access the crowdsource data 122 and apply a second weight value to at least a portion of the crowdsource data 122 to determine a second measurement. The network management module 116 may combine the first measurement and the second measurement to determine the estimated total channel throughput for the network that the user device 102 is using. The network management module 116 based on the estimated total channel throughput, may determine a recommended resolution of one or more elements associated with the application or web service to be presented on a display device associated with the user device 102. For example, the network management module 116 may determine that the estimated total channel throughput for the Wi-Fi network is insufficient to download high resolution images and videos. The network management module 116 may send quality data 128 to the prioritization module 112 to include in a network application request to have the server 106 send lower resolution images and videos. In another example, the network management module 116 may determine that the estimated total channel throughput is sufficient to download high resolution images and videos. The network management module 116 may send the quality data 128 to the prioritization module 112 to include in a network application request to have the server send higher resolution images and videos.

The user device 102 may be configured to send a network request 130 to the server 106. The network request 130 may correspond to the application or web service that has the lowest estimated network response. For example, as described above, the network request determination 124 may access the filtered crowdsource data 122. The filtered crowdsource data 122 may indicate that similar user devices that are in Seattle and using 4G networks may have an estimated network response time of one (1) second for the music application, ten (10) seconds for the news application, and two (2) seconds for the social media application. Based on the estimated network response times, the network request determination 124 may prioritize that the music application network request be sent first, then the social media application network request, and then the news application network request. In this example, the user device 102 may send the network request 130 that corresponds to the music application. The network request 130 may include the quality data 128, as described above.

The server 106 may send network response data 132 to the user device 102. The network response data 132 may include images and videos at a resolution that corresponds to the quality data 128. The user device 102 in response to receiving the network response data 132 may send the network request 130 next in the ordered network request queue 126. Continuing the above example, the user device 102 may send the network request 130 that corresponds with the social media application.

In other implementations, the user device 102 may determine a network response time associated with the network response data 132. The user device 102 may send the determined network response time and the one or more parameters associated with the network request 130 to the server 106. For example, the one or more parameters may indicate that the user device 102 is located in Seattle, using a 4G network, the application was the music application and the determined network response time was two (2) seconds. The server 106 upon receipt of the determined network response time and one or more parameters may update the crowdsource data 110.

FIG. 2 is an example 200 of crowdsource data that indicates a network response time for particular parameters. The example 200 may include a crowdsource module 202. The crowdsource module 202 may be the crowdsource module 108 as in FIG. 1. The crowdsource module 202 may receive the response data 104 from the user device(s) 102.

The response data 104, as described above, may include URI information, location information, network information, application information, network response time information, total channel throughput information, user device information, and so forth.

The crowdsource module 202 may generate crowdsource data 204 based on the response data 104. The crowdsource data 204 may be the crowdsource data 110 as described in FIG. 1. The crowdsource data 204 may include URI 206, location 208, network 210, response time 212, total channel throughput 214, application 216, user device type 218, and so forth.

The URI 206 may include information that is indicative of an address to a resource on the internet, a Hypertext Transfer Protocol (HTTP) command, and so forth. For example, the URI 206 for a particular application may be www.example1.com, www.example2.com, getpage.html, and so forth.

The location 208 may include information that is indicative of a location of the user device 102 from where a network request occurred. The location 208 may be obtained from a sensor on the user device 102, from an external service, and so forth. For example, the location 208 may be provided by a satellite navigation receiver, such as Global Positioning System, GLONASS, BeiDou, and so forth. In another example, the location 208 may be provided by an external service, such as a cellular carrier may use trilateration of signal data from multiple cellular sites to determine the location 208. The location 208 may be expressed as latitude, longitude, altitude, describe street address, zip code, state, county, building, floor, and so forth. For example, the location 208 may describe that the user device 102 is in Seattle. In another example, the location 208 may describe latitude, longitude, and altitude of the user device, such as 30.2672° N, 97.7431° W with an altitude of 1048 feet.

The network 210 may be information indicative of a wireless telecommunication technology. For example, the wireless telecommunication technology may include a wireless cellular data network (WCDN), fourth generation of wireless mobile telecommunications technology (4G), third generation of wireless mobile telecommunications technology (3G), Wi-Fi, and so forth.

The response time 212 may be information indicative of a response time associated with a network application request. For example, the network response time associated with a network application request for a music application may be two (2) seconds.

The total channel throughput 214 may be information indicative of an amount of data being transmitted in a fixed amount of time associated with the network information and the location information. For example, the total channel throughput information may be 7 bits per second (bits/s). In other examples, the total channel throughput information may indicate high, medium, and low, or great, average, and poor.

The application 216 may be information indicative of a type of software that is configured to enable a user device 102 to execute one or more tasks. For example, the application information may indicate a mobile application, software program, or web service seeking to send a network request.

The user device type 218 may be information indicative of a type of user device 102. For example, the user device type 218 may indicate that the user device 102 is a particular smartphone.

The crowd source module 202 may be configured to receive the request crowdsource data 120. The crowdsource module 202 may be configured to determine filtered crowdsource data 122 to include at least crowdsource data 110 associated with the applications that have the pending network request and the one or more parameters associated with the user device 102. For example, the crowdsource module 202 may filter the crowdsource data 110 to include data of similar user devices located in Seattle, using a 4G network, and network response times associated with the applications 1, 2, and 3. The crowdsource module 202 may send the filtered crowdsource data 122 to the user device 102.

Figure 3:
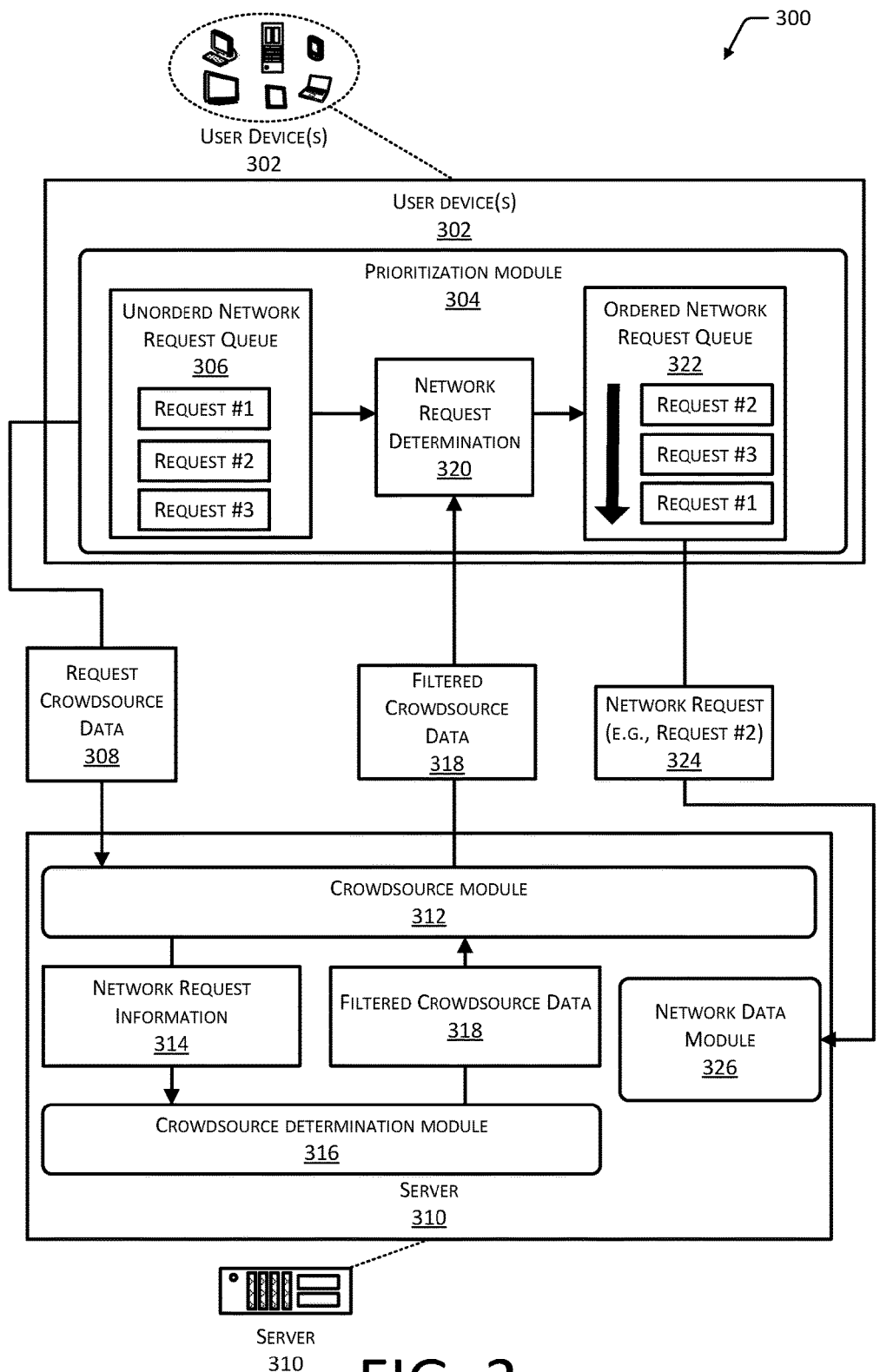
FIG. 3 depicts an environment for prioritizing network requests.

FIG. 3 depicts an environment 300 for prioritizing network requests. The environment 300 may include a user device 302. The user device 302 may be the user device 102. The user device may include a prioritization module 304. The prioritization module 304 may be the prioritization module 112. In one implementation, the prioritization module 304 may be configured to receive one or more network requests from one or more applications. The prioritization module 304 may be configured to store the network requests in an unordered network request queue 306. The unordered network request queue 306 may indicate a number of network requests from a number of applications or web page requests. For example, the user device 302 may be operating a music application, a news application, and a social media application. Each of these applications may provide a network request to an OS with each of these requests indicating a high priority. The user device 302 may send a request crowdsource data 308 request to the server 310. The request crowdsource data 308 may include one or more parameters. The one or more parameters may include, as described above, a location of the user device 302, a network, applications seeking to send a network request, and so forth. For example, the one or more parameters may indicate that the user device 302 is located within the limits of zip code 98108, using a 4G network, and has a music, news, and social media application seeking to send a network request.

The server 310 may be the server 106. The server 310 may include a crowdsource module 312. The crowdsource module may be the crowdsource module 108. The crowdsource module 312 may send network request information 314 to a crowdsource determination module 316. The network request information 314 may include the one or more parameters included in the request crowdsource data 308. The crowdsource determination module 316 may be configured to filter the crowdsource data 110 to correspond the one or more parameters. For example, the crowdsource determination module 316 may filter the crowdsource data 110 to include data of similar user devices located within the limits of zip code 98108, using a 4G network, and network response times associated with the music, news, and social media applications. The crowdsource determination module 316 may send filtered crowdsource data 318 to the crowdsource module 312. The crowdsource module 312 may send the filtered crowdsource data 318 to the user device 302.

In another implementation, the crowdsource determination module 316 may filter the crowdsource data 110 to include data of other networks and estimated network response times for the other networks. For example, the crowdsource determination module 316 may filter the crowdsource data 110 to include data of similar user devices located within the limits of zip code 98108, using a 3G, 4G, Wi-Fi, and so forth, network, and network response times associated with the music, news, and social media applications for each of the networks. The crowdsource determination module 316 may send the filtered crowdsource data 318 to the crowdsource module 312. The crowdsource module 312 may send the filtered crowdsource data 318 to the user device 302.

In other implementations, the crowdsource determination module 316 may filter the crowdsource data 110 to include data of similar user devices located within the limits of zip code 98108, using any network, and network response times associated with the applications on the user device 302. For example, the user device 302 may have the music application, news application, social media application, navigation application, purchase items application, and so forth. The crowdsource determination module 316 may filter the crowdsource data 110 to include network response times for all of those applications regardless of whether the network request information 314 indicates a network request. The crowdsource determination module 316 may send the filtered crowdsource data 318 to the crowdsource module 312. The crowdsource module 312 may send the filtered crowdsource data 318 to the user device 302.

In another implementation, the crowdsource determination module 316 may filter the crowdsource data 110 to include data of similar user devices located within a threshold distance of latitude, longitude, and altitude of the user device 302. For example, the user device 302 may have latitude and longitude coordinates of 47.6062° N, 122.3321° W and an altitude of 1048 feet. The user device 302 may also have the music application, news application, social media application, and so forth, seeking to send a network request to the server 310. The crowdsource determination module 316 may filter the crowdsource data 110 to include data of similar user devices located within a five (5) mile radius of the latitude and longitude coordinates of 47.6062° N, 122.3321° W, using a 3G, 4G, Wi-Fi, and so forth, network, and network response times associated with the music, news, and social media applications for each of the networks. The crowdsource determination module 316 may send the filtered crowdsource data 318 to the crowdsource module 312, as described above.

The user device 302 may include network request determination 320. The network request determination 320 may be the network request determination 124. The network request determination 320 may be configured to determine a prioritized order to send the network requests stored in the unordered network request queue 306. The network request determination 320 may determine an estimated network response time for each of the network application requests based on the filtered crowdsource data 318, as described above. For example, the network request determination 320 may access the filtered crowdsource data 318. The filtered crowdsource data 318 may indicate that similar user devices that are within the limits of zip code 98108 and using 4G networks may have an estimated network response time of five (5) seconds for the music application, ten (10) seconds for the news application, and two (2) seconds for the social media application. Based on the estimated network response times, the network request determination 320 may prioritize that the social media application network request be sent first, then the music application network request, and then the news application network request. The network request determination 320 may send the prioritized order to an ordered network request queue 322.

In another implementation, the network request determination 320 may be configured to determine the prioritized order by averaging the estimated response times included in the filtered crowdsource data 318. For example, the network request determination 320 may access the filtered crowdsource data 318. The filtered crowdsource data 318 may indicate that similar user devices that are within the limits of zip code 98108 and using 4G networks may have an estimated network response time of one (1) second, three (3) seconds, and one (1) second for the music application, ten (10) seconds, fifteen (15) seconds, and twelve (12) seconds, for the news application, and two (2) seconds, three seconds (3), and four (4) seconds, for the social media application. The network request determination 320 may determine that the average estimated response time for the music application is 1.67 seconds, for the news application is 12.33 seconds, and for the social media application is 3 seconds. Based on the estimated network response times, the network request determination 320 may prioritize that the music application network request be sent first, then the social media application network request, and then the news application network request. The network request determination 320 may send the prioritized order to the ordered network request queue 322.

In other implementations, network request determination 320 may determine a prioritized order based on the estimated network response time for each of the network application requests based on the filtered crowdsource data 318. For example, the network request determination 320 may access the filtered crowdsource data 318. The filtered crowdsource data 318 may indicate that similar user devices that are within the limits of zip code 98108 and using 4G networks may have an estimated network response time of two (2) seconds for the music application, fifteen (15) seconds for the news application, and four (4) seconds for the social media application. Based on the estimated network response times, the network request determination 320 may prioritize that the news application be sent first, then the social media network request, and then the music application network request. The network request determination 320 may determine to send the news application network request first so that the network request has more time to be processed. The network request determination 320 may send the prioritized order to the ordered network request queue 322.

The user device 302 may be configured to include the ordered network request queue 322. The ordered network request queue 322 may be the ordered network request queue 126. The ordered network request queue 322 may store the determined prioritized order. The determined prioritized order may be received from the network request determination 320. For example, the network request determination 320 may determine, as described above, that the social media application network request may be sent first, then the music application network request, and then the news application network request. The ordered network request queue 322 may store these network requests in the prioritized order of increasing estimated network response time.

In other implementations, the network request determination 320 may determine other prioritized orders and the ordered network request queue 322 may store the network request. For example, the network request determination 320 may determine a prioritized order where the network response times decrease, such as the news application network request has a fifteen (15) second estimated response time, the music application network request has a five (5) second estimated response time, and the social media application network request has a one (1) second estimated response time. In this example, the ordered network request queue 322 may store the network requests that the news application network request may be sent first, then the music application network request, and then the social media application network request.

The user device 302 may be configured to send a network request 324 to the server 310. The network request 324 may correspond to the network request that is stored first in the ordered network request queue 322. For example, the ordered network request queue 322 may store the social media application network request to be sent first, then the music application network request, and then the news application network request. In this example, the user device 302 may send the network request 324 that corresponds to the social media application network request. The user device 302 in response to receiving a network response associated with the social media application network request may send the network request 324 that corresponds to the music application network request.

The server 310 may be configured to include a network data module 326. The network data module 326 may be configured to send a network response that corresponds with the network request 324. For example, the network request 324 may correspond to the social media application network request. The network data module 326 may access network response data that is associated with the request, such as images and videos to be included in a social media feed. The network data module 326 may be configured to send the network response to the user device 302. The user device 302 upon receipt of the network response may be configured to present one or more elements associated with the response. For example, the user device 302 may present the images and videos to be included in the social media feed of the social media application.

Figure 4:
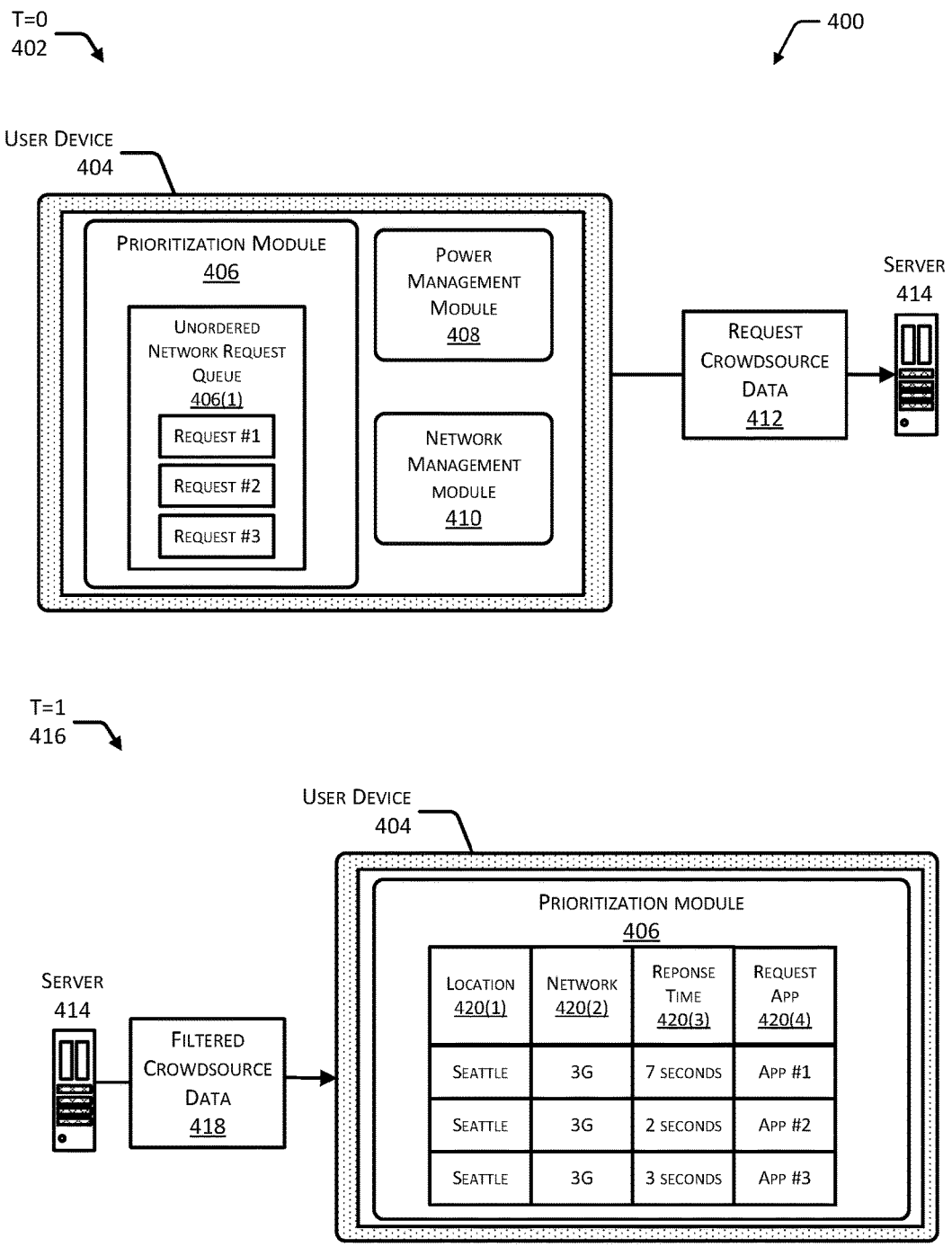

FIG. 4 is an example environment (example) 400 for efficient network usage. The example 400, at 402 (T=0), includes a user device 404. The user device 404 may be the user device 102 or 302. The user device 404 may be configured to include a prioritization module 406, a power management module 408 and a network management module 410. The prioritization module 406 may be the prioritization module 112 or 304, as described above. The power management module 408 may be the power management module 114, as described above. The network management module 410 may be the network management module 116, as described above.

The prioritization module 406 may be configured to include an unordered network request queue 406(1). The unordered network request queue 406(1) may indicate a number of network requests from a number of applications or web page requests, as described above. For example, the network requests may correspond to a network request for the music application, news application, and social media application. The user device 404 may be configured to send request crowdsource data 412 to a server 414. The request crowdsource data 412 may include one or more parameters, as described above. The one or more parameters may include, as described above, a location of the user device 404, a network, applications seeking to send a network request, and so forth.

At 416 (T=1), the server 414 may send filtered crowdsource data 418 to the user device 404. The server 414 may be the server 106 or 310. The filtered crowdsource data 418 may be the filtered crowdsource data 122 or the filtered crowdsource data 318. The crowdsource data 110 may include, location 420(1), network 420(2), response time 420(3), request application 420(4), and so forth. The location 420(1) may indicate location information, as described above. The network 420(2) may indicate network information, as described above, the response time 420(3) may be network response time information, as described above. The request application 420(4) may indicate application information, as described above.

The server 414 may be configured to filter the crowdsource data 110 to correspond the one or more parameters, as described above. For example, the server 414 may filter the crowdsource data 110 to include data of similar user devices located within Seattle, using a 3G network, and network response times associated with the music, news, and social media applications.

FIG. 5 depicts a continuation of the example 400 from FIG. 4 for efficient network usage. In one implementation, the user device 404, at 502 (T=2) may include a network request determination 504. The network request determination 504 may be the network request determination 124 or the network request determination 320, as described above. The network request determination 504 may be configured to determine a prioritized order to send the network requests stored in the unordered network request queue 406(1). The network request determination 504 may determine an estimated network response time for each of the network application requests, as described above. For example, the network request determination 504 may determine based on the filtered crowdsource data 418, as described above, that the social media application network request be sent first, then the music application network request, and then the news application network request. The network request determination 504 may send the prioritized order to the ordered network request queue 506.

In one implementation, the prioritization module 406 may send the filtered crowdsource data 418 to the power management module 408. The power management module 408 may be configured to transition one or more components of the user device 404 from the first power mode to the second power mode, as described above. For example, as described above, the user device 404 may receive the filtered crowdsource data 418 which indicates that similar user devices, in Seattle, on a Wi-Fi network may have an estimated network response time of five (5) seconds for the music application, ten (10) seconds for the news application, and three (3) seconds for the social media application. The power management module 408 may determine that for each of these network requests the processor of the user device 404 may transition from the first power mode to the second power mode. This enables the user device 404 to use less power from the battery, reduce runtime between charges, decrease temperature of the user device 404, and so forth.

In other implementations, the prioritization module 406 may send the filtered crowdsource data 418 to the network management module 410. The network management module 410 may determine an estimated total channel throughput, as described above. For example, the user device 404 may be using a 3G network. The network management module 410 may measure the total channel throughput of the 3G network. The network management module 410 may apply a first weight value to the traffic data to determine a first measurement. The network management module 410 may access the filtered crowdsource data 418 and apply a second weight value to at least a portion of the filtered crowdsource data 418 to determine a second measurement. The network management module 410 may combine the first measurement and the second measurement to determine the estimated total channel throughput for the 3G network. The network management module 410 based on the estimated total channel throughput, may determine a recommended resolution of one or more elements associated with the application or web service to be presented on a display device associated with the user device 404, as described above. The network management module 410 may send quality data 508 to the prioritization module 406 to include in a network application request to have the server 414 send higher or lower resolution images and videos, as described above.

In another implementation, the network management module 410 may determine an estimated total channel throughput for at least two networks. For example, the user device 404 may be using a Wi-Fi network and have available a 4G network. The network management module 410 may measure the total channel throughput of the 4G network and the Wi-Fi network. The network management module 410 may apply a first weight value to the traffic data to determine a first measurement. The network management module 410 may access the filtered crowdsource data 418 and apply a second weight value to at least a portion of the filtered crowdsource data 418 to determine a second measurement. The network management module 410 may combine the first measurement and the second measurement to determine the estimated total channel throughput for the Wi-Fi network. The network management module 410 based on the estimated total channel throughput, may determine a recommended resolution of one or more elements associated with the application or web service to be presented on a display device associated with the user device 404, as described above. The network management module 410 may determine the estimated total channel throughput for the available 4G network, as described above. The network management module 410 may send quality data 508 for the Wi-Fi network and the 4G network to the prioritization module 406 to include in a network application request to have the server 414 send higher or lower resolution images and videos, as described above.

In other implementations, the network management module 410 may continuously determine the estimated total channel throughput for a network. For example, as described above, the network management module 410 may apply a first weight value to the traffic data and a second weight value to the filtered crowdsource data 418 to determine a first and second measurement. The network management module 410 may combine the first measurement and the second measurement to determine a first estimated total channel throughput for the Wi-Fi network. The network management module 410 may increase the first weight value and apply the increased first weight value to the traffic data to determine an updated first measurement. The network management module 410 may decrease the second weight value and apply the decreased second weight value to the filtered crowdsource data 418 to determine an updated second measurement. The network management module 410 may combine the updated first measurement and the updated second measurement to determine a second estimated total channel throughput for the Wi-Fi network. The network management module 410 may send quality data 508 for the Wi-Fi network based on the second estimated total channel throughput for the Wi-Fi network.

In one implementation, the user device 404, at 510 (T=3) may send a network request 512 to the server 414. The network request 512 may correspond to the network request that is stored first in the ordered network request queue 506. For example, the ordered network request queue 506 may store the social media application network request to be sent first, then the music application network request, and then the news application network request. In this example, the user device 404 may send the network request 512 that corresponds to the social media application network request and the quality data 508.

The power management module 408, in response to the user device 404 sending the network request 512, may instruct the operating system 514 to send power saving instructions 516 to the processor 518. The power saving instructions 516 may transition the processor 518 from the first power mode to the second power mode. The second power mode may consume less battery power than the first power mode. The power saving instructions 516 may transition one or more components of the user device 404 from the first power mode to the second power mode. For example, the one or more components that transition from the first power mode to the second power mode may be a display, radio, Bluetooth, global positioning system (GPS), microphone, camera, and so forth.

Figure 6:
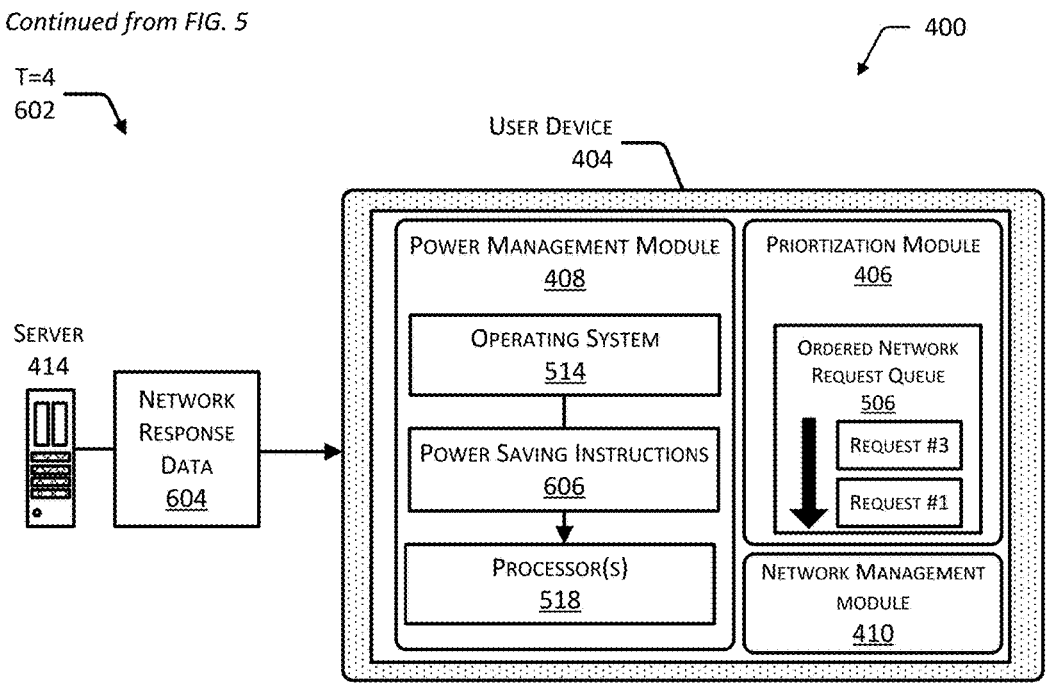

FIG. 6 depicts the continuation of the example 400 from FIGS. 4 and 5 for efficient network usage. In one implementation, the server 414, at 602 (T=4) may send network response data 604 to the user device 404. The network response data 604 may correspond with the network request 512. For example, the network request 512 may correspond to the social media application network request. The network response data 604 may include information associated with the social media application, such as images and videos to be included in a social media feed. The user device 404 upon receipt of the network response may be configured to present one or more elements associated with the response. For example, the user device 404 may present the images and videos to be included in the social media feed of the social media application.

In another implementation, the user device 404 upon receipt of the network response data 604, may send the network request 512 that corresponds to the next network request stored in the ordered network request queue 506. For example, the user device 404 may send the network request 512 that corresponds with the music application network request. In this example, the network request 512 may include the quality data 508.

In other implementations, the power management module 408, in response to the user device 404 sending the network response data 604, may instruct the operating system 514 to send power saving instructions 606 to the processor 518. The power saving instructions 606 may transition the processor 518 from the second power mode to the first power mode. The power saving instructions 606 may transition one or more components of the user device 404 from the second power mode to the first power mode. For example, the one or more components that transition from the first power mode to the second power mode may be a display, radio, Bluetooth, global positioning system (GPS), microphone, camera, and so forth.

In another implementation, the user device 404 may determine that the user device 404 has moved from a first location to a second location. For example, the user device 404 may determine that the user device 404 has moved from being within the limits of zip code 98108 to now being within the limits of zip code 98168. The user device 404 may send a request to the server 414 for updated crowdsource data 110. The request may include one or more parameters, as described above. For example, the one or more parameters may include that the user device 404 is using a 3G network, and seeking network response times associated with the music, navigation, and social media applications. The user device 404 may receive the updated crowdsource data 110 that is based on network response times to a plurality of network application requests from a plurality of user devices that correspond to the second location. For example, the updated crowdsource data 110 may include data of similar user devices located within the limits of zip code 98168, using a 3G network, and network response times associated with the music, navigation, and social media applications. The user device 404 may determine an estimated response time for each of the plurality of network requests associated with the applications on the user device 404, as described above. For example, the user device 404 may determine that the estimated network response time associated with the music application network request is five (5) seconds, the estimated network response time associated with the navigation application network request is two (2) seconds, and that the estimated network response time associated with the social media application network request is ten (10) seconds. The user device 404 may, based on the estimated response times, determine an order to send each of the plurality of network requests. Continuing the above example, the user device 404 may determine that the network request associated with the navigation application be sent first, the music application be sent second and the social media application be sent third. The user device 404 may be configured to send in the determined order the plurality of network requests. For example, the user device 404 may send the network request associated with the navigation application.

In yet another implementation, the user device 404 may determine that the user device 404 has moved from a first location to a second location. For example, the user device 404 may determine that the user device 404 has moved from being within the limits of zip code 98108 to now being within the limits of zip code 98168. In this example, the server 414, in anticipation that the user device 404 may move, may filter the crowdsource data 110 to include similar user devices that are proximate to the user device 404. For example, the server 414 may filter the crowdsource data 110 to include similar user devices that are within five (5) to ten (10) miles of the user device 404. The server 414 may send the filtered crowdsource data 418 to the user device 404. The user device 404 may store the filtered crowdsource data 418 so that when the user device 404 moves from the first location to the second location the prioritization module 406 may update the order in which to send the network requests, as described above.

In other implementations, the user device 404 may send the network response data 604 to the network management module 410. The network management module 410 based on the response time associated with the network response data 604 may determine an updated estimated total channel throughput for the network that the user device 404 is using. For example, the network management module 410 may increase the first weight value and apply the increased first weight value to the traffic data to determine an updated first measurement. The traffic data includes the network response time associated with the network response data 604. The network management module 410 may decrease the second weight value and apply the decreased second weight value to the filtered crowdsource data 418 to determine an updated second measurement. The network management module 410 may combine the updated first measurement and the updated second measurement to determine the updated estimated total channel throughput for the Wi-Fi network.

Figure 7:
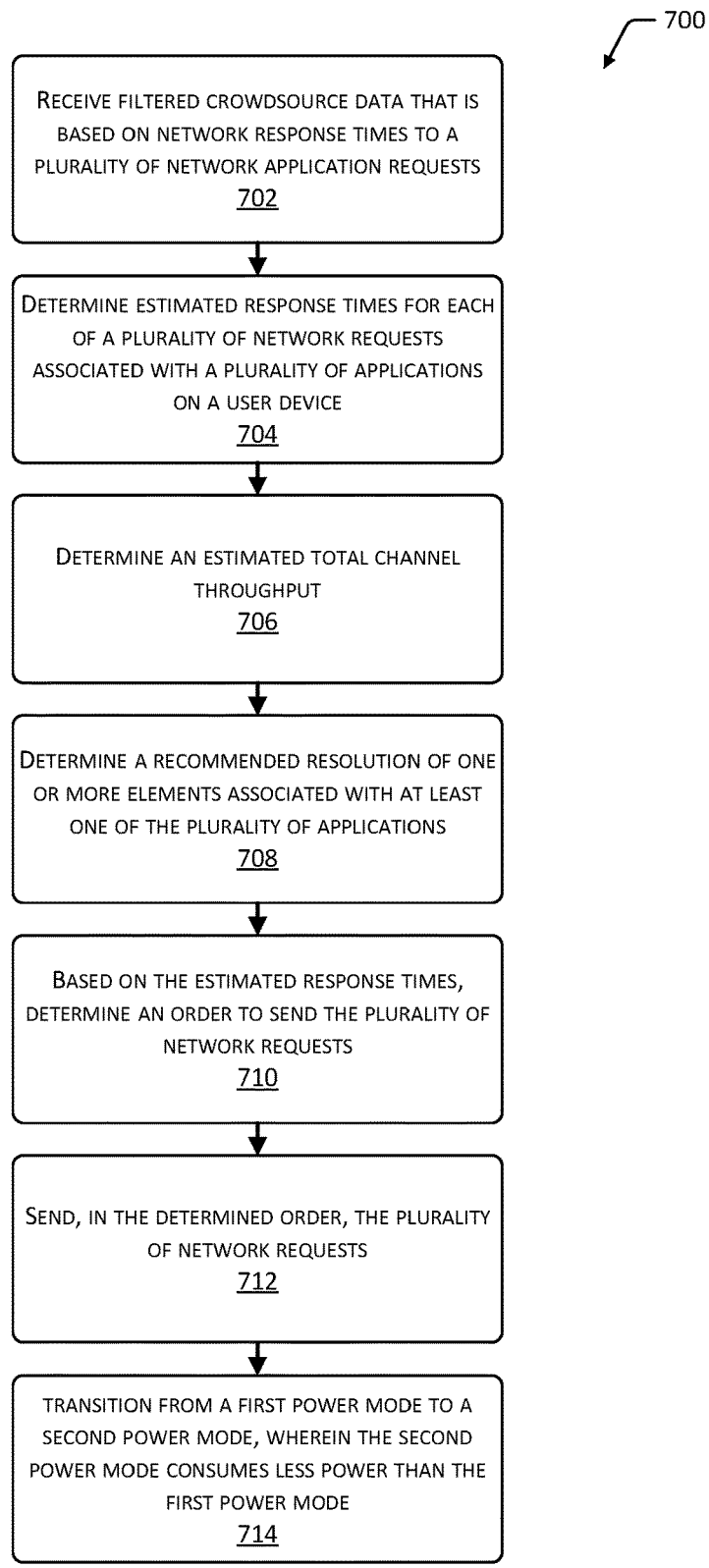
FIG. 7 depicts a flow diagram of a process for efficient network usage.

FIG. 7 is a flow diagram of a process 700 for efficient network usage. Although the process 700 is described with reference to the flowchart illustrated in FIG. 7, many other methods performing the acts associated with the process 700 may be used. For example, the order of the steps may be changed, some of the steps described may be optional, and additional steps may be included.

At 702, the user device 102 may receive the filtered crowdsource data 122. The filtered crowdsource data 122, as described above, may be based on network response times to a plurality of network application requests. The network response times may be associated with one or more parameters that indicate information associated with a plurality of user devices during which the plurality of network application requests was sent. For example, the filtered crowdsource data 122 may include data of similar user devices located within the limits of zip code 98108, using a 4G network, and network response times associated with the music, news, and social media applications.

At 704, the user device 102 may determine estimated response times for each of a plurality of network requests associated with a plurality of applications on a user device 102. The user device 102 may include the network request determination 124, as described above. The network request determination 124 may determine the estimated network response time for each of the network application requests based on the filtered crowdsource data 122. For example, the network request determination 124 may access the filtered crowdsource data 122. The filtered crowdsource data 122 may indicate that similar user devices that are in Seattle and using 4G networks may have an estimated network response time of one (1) second for the music application, ten (10) seconds for the news application, and two (2) seconds for the social media application.

At 706, the user device 102 may determine an estimated total channel throughput. The user device 102 may determine that the estimated total channel throughput, as described above, is 7 bits per second (bits/s). In other examples, the user device 102 may determine an indication of throughput such as high, medium, and low, or great, average, and poor to indicate the estimated total channel throughput.

At 708, the user device 102 may determine a recommended resolution of one or more elements associated with at least one of the plurality of applications. For example, the user device 102 may include the network management module 116. The network management module 116 may determine that the estimated total channel throughput for the Wi-Fi network is insufficient to download high resolution images and videos. The network management module 116 may send quality data 128 to the prioritization module 112 to include in a network application request to have the server send lower resolution images and videos.

At 710, the user device 102 may, based on the estimated response times, determine an order to send the plurality of network requests. For example, the filtered crowdsource data 122 may indicate that similar user devices that are in Seattle and using 4G networks may have an estimated network response time of one (1) second for the music application, ten (10) seconds for the news application, and two (2) seconds for the social media application. Based on the estimated network response times, the network request determination 124 may prioritize that the music application network request be sent first, then the social media application network request, and then the news application network request.

At 712, the user device 102 may send, in the determined order, the plurality of network requests. For example, the user device 102 may send the network request that is associated with the music application.

At 714, the user device 102 may transition from a first power mode to a second power mode. The second power mode consumes less power than the first power mode. The user device 102, as described above, may include the power management module 114. The power management module 114, as described above, may be configured to transition one or more components of the user device 102 from the first power mode to the second power mode. For example, in response to sending a network request the power management module 114 may transition the processor(s) 518 from the first power mode to the second power mode, as described above.

Figure 8:
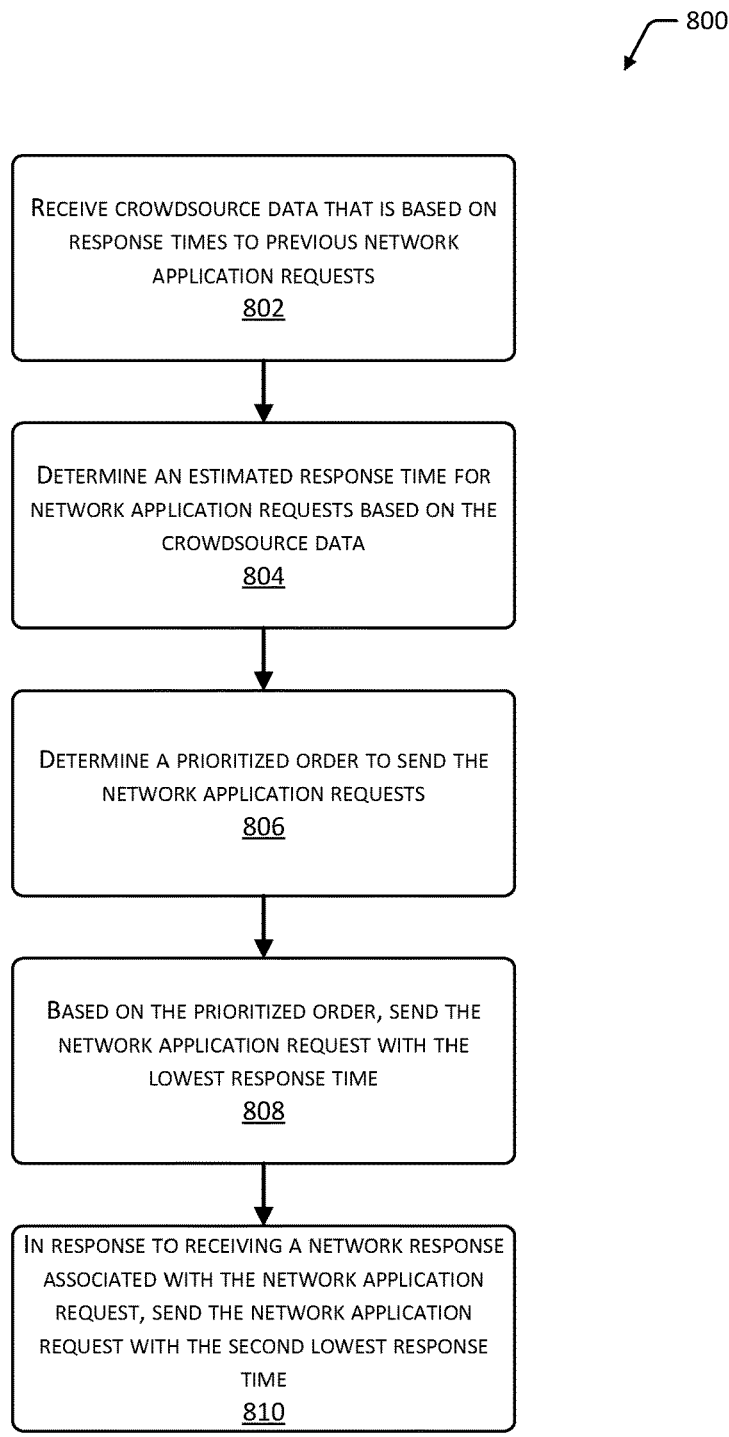
FIG. 8 depicts a flow diagram of a process for efficient network usage.

FIG. 8 is a flow diagram of a process 800 for efficient network usage. Although the process 800 is described with reference to the flowchart illustrated in FIG. 8, many other methods performing the acts associated with the process 800 may be used. For example, the order of the steps may be changed, some of the steps described may be optional, and additional steps may be included.

At 802, the user device 102 may receive the crowdsource data 110 that is based on response times to previous network application requests. For example, the user device 102 may receive the crowdsource data 110 from the server 106, as described above. The crowdsource data 110 may include data of similar user devices located within the limits of zip code 98108, using a 4G network, and network response times associated with the music, news, and social media applications.

At 804, the user device 102 may determine an estimated response time for network application requests based on the crowdsource data 110. The user device 102 may include the network request determination 124, as described above. The network request determination 124 may determine the estimated network response time for each of the network application requests based on the filtered crowdsource data 122. For example, the network request determination 124 may access the filtered crowdsource data 122. The filtered crowdsource data 122 may indicate that similar user devices that are in Seattle and using 4G networks may have an estimated network response time of one (1) second for the music application, ten (10) seconds for the news application, and two (2) seconds for the social media application.

At 806, the user device 102 may determine a prioritized order to send the network application requests. The user device 102, as described above, may determine the prioritized order by determining estimated response times for each of a plurality of network requests associated with a plurality of applications on user devices. The user device 102 may include the network request determination 124, as described above. The network request determination 124 may determine the estimated network response time for each of the network application requests based on the filtered crowdsource data 122. For example, the network request determination 124 may access the filtered crowdsource data 122. The filtered crowdsource data 122 may indicate that similar user devices that are in Seattle and using 4G networks may have an estimated network response time of one (1) second for the music application, ten (10) seconds for the news application, and two (2) seconds for the social media application. Based on the estimated network response times, the network request determination 124 may prioritize that the music application network request be sent first, then the social media application network request, and then the news application network request.

At 808, the user device 102 may, based on the prioritized order, send the network application request with the lowest response time. For example, the user device 102 may send the network request that is associated with the music application.

At 810, the user device 102 may in response to receiving a network response associated with the network application request, send the network application request with the second lowest response time. For example, the user device 102 may send the network request that is associated with the social media application.

Figure 9:
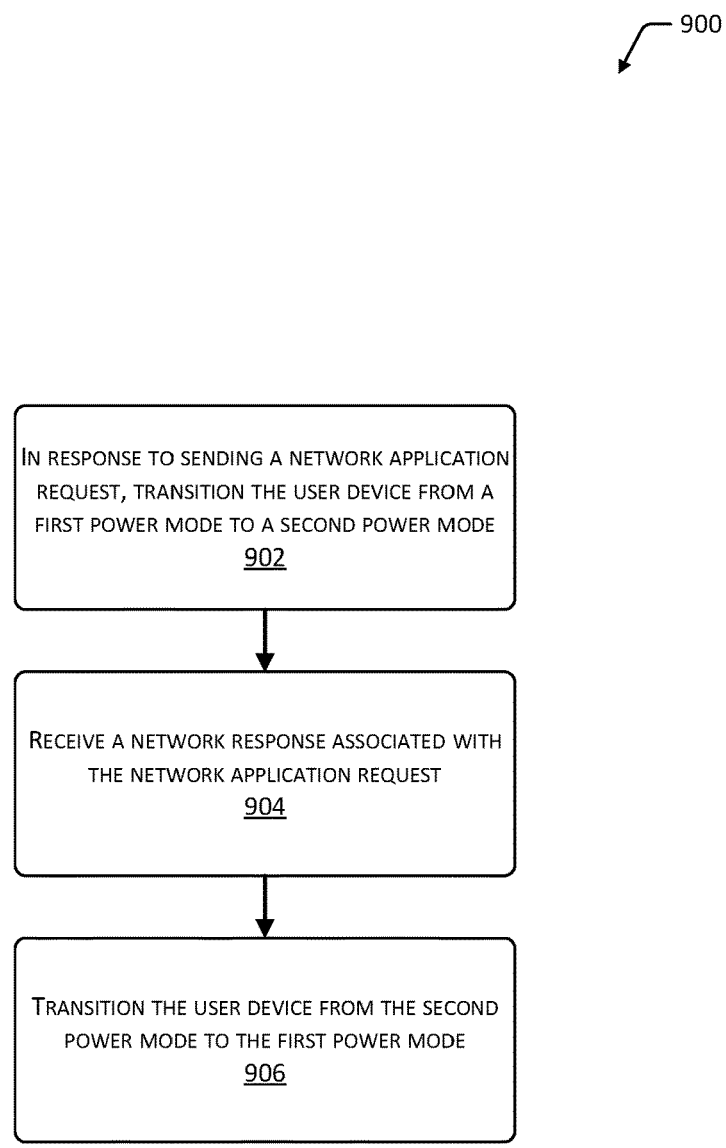
FIG. 9 depicts a flow diagram of a process for providing power saving measures during a network request.

FIG. 9 is a flow diagram of a process 900 for providing power saving measures during a network request. Although the process 900 is described with reference to the flowchart illustrated in FIG. 9, many other methods for performing the acts associated with the process 900 may be used. For example, the order of the steps may be changed, some of the steps described may be optional, and additional steps may be included.

At 902, in response to sending a network application request, transition the user device 102 from a first power mode to a second power mode. The user device 102, as described above, may include the power management module 114. The power management module 114 may be configured to transition one or more components of the user device 102 from a first power mode to a second power mode. The second power mode may consume less battery power than the first power mode. The one or more components that the power management module 114 may transition from the first power mode to the second power mode may be a processor, display, radio, Bluetooth, global positioning system (GPS), microphone, camera, and so forth. For example, as described above, the user device 102 may receive the filtered crowdsource data 122 which indicates that similar user devices, in Seattle, on a Wi-Fi network may have an estimated network response time of five (5) seconds for the music application, ten (10) seconds for the news application, and three (3) seconds for the social media application. The power management module 114 may determine that for each of these network requests the processor of the user device 102 may transition from the first power mode to the second power mode.

At 904, the user device 102 may receive a network response associated with the network application request. For example, the user device 102 may receive a network response associated with the music application network request, as described above.

At 906, the user device 102 may transition from the second power mode to the first power mode. For example, the power management module 114 may send power saving instructions 606 to transition one or more components of the user device 102, such as the processor 518 from the second power mode to the first power mode, as described above.

Figure 10:
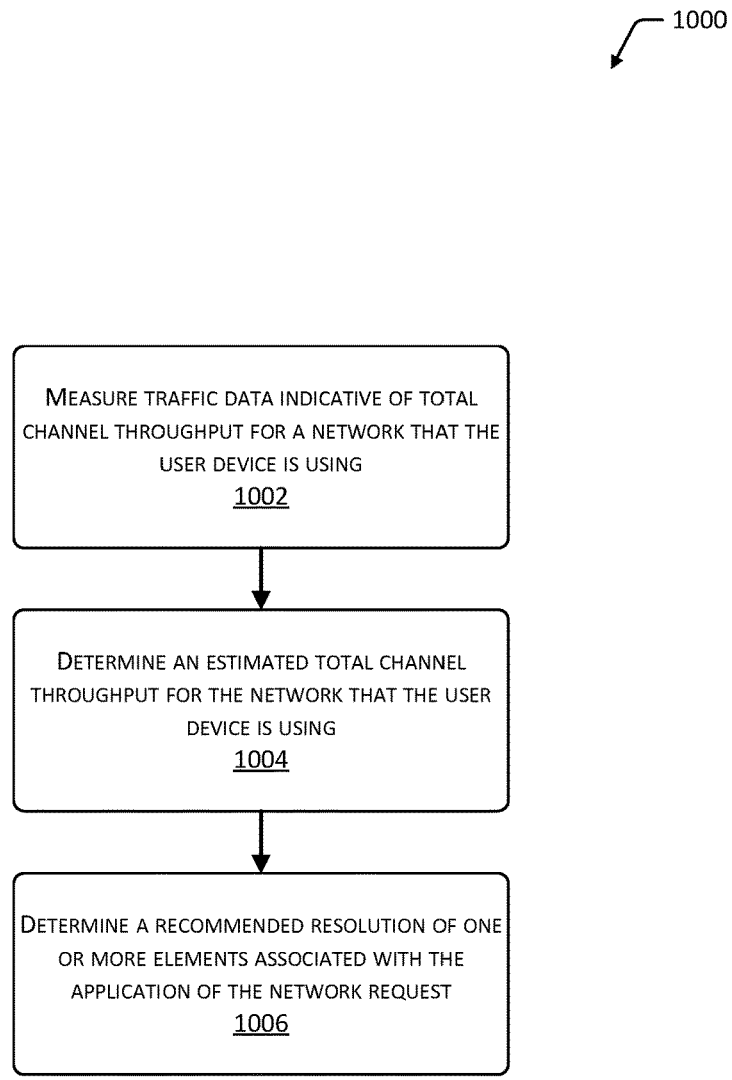
FIG. 10 depicts a flow diagram of a process for determining an estimate of total channel throughput.

FIG. 10 is a flow diagram of a process 1000 for determining an estimate of total channel throughput. Although the process 1000 is described with reference to the flowchart illustrated in FIG. 10, many other methods performing the acts associated with the process 1000 may be used. For example, the order of the steps may be changed, some of the steps described may be optional, and additional steps may be included.

At 1002, the user device 102 may measure traffic data indicative of total channel throughput for a network that the user device 102 is using. For example, the user device 102 may be using a Wi-Fi network. The network management module 116 may measure the traffic data.

At 1004, the user device 102 may determine an estimated total channel throughput for the network that the user device 102 is using. The user device 102 may include the network management module 116, as described above. The network management module 116 may apply a first weight value to the traffic data to determine a first measurement. The network management module 116 may access the filtered crowdsource data 122 and apply a second weight value to at least a portion of the filtered crowdsource data 122 to determine a second measurement. The network management module 116 may combine the first measurement and the second measurement to determine the estimated total channel throughput for the network that the user device 102 is using.

At 1006, the user device 102 may determine a recommended resolution of one or more elements associated with the application of the network request. The network management module 116 based on the estimated total channel throughput, may determine a recommended resolution of one or more elements associated with the application or web service to be presented on a display device associated with the user device 102. For example, the network management module 116 may determine that the estimated total channel throughput for the Wi-Fi network is insufficient to download high resolution images and videos. The network management module 116 may send quality data 128 to the prioritization module 112 to include in a network application request to have the server send lower resolution images and videos. In another example, the network management module 116 may determine that the estimated total channel throughput is sufficient to download high resolution images and videos. The network management module 116 may send the quality data 128 to the prioritization module 112 to include in a network application request to have the server send higher resolution images and videos.

Figure 11:
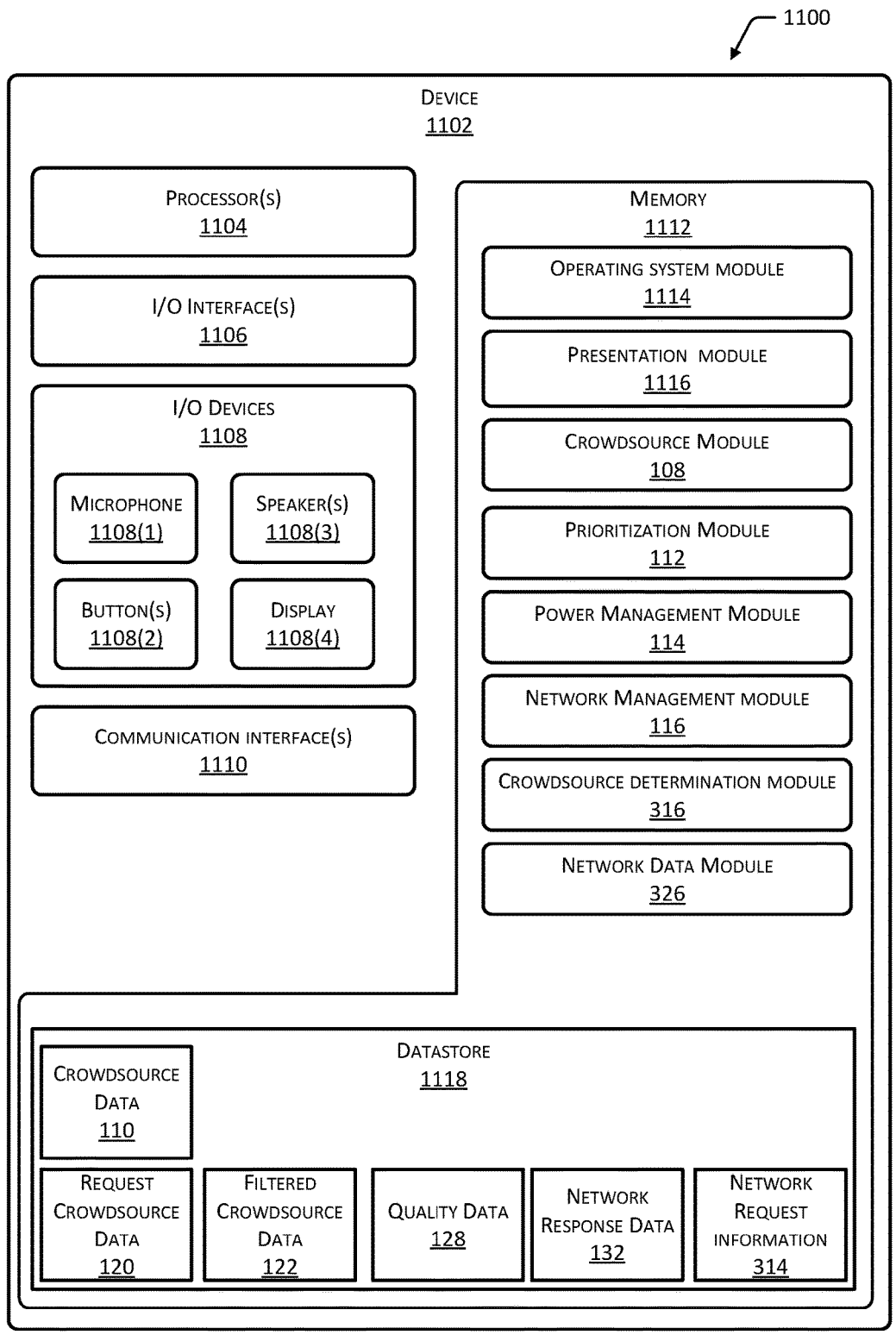
FIG. 11 illustrates a block diagram of a device for prioritizing network requests and providing power saving measures during a network request.

FIG. 11 illustrates a block diagram 1100 of a device 1102. The device 1102 may be the user device 102, 302, 404, or the server 106, 414. The device 1102 is illustrative and non-limiting, and may be a desktop computer, a tablet computer, server, a wearable computer, an e-book reader, a media device, a cellular phone, a laptop computer, or another suitable apparatus. The device 1102 may include one or more processors 1104 configured to execute one or more stored instructions. The processor(s) 1104 may comprise one or more cores, and may also be referred to as hardware processors. The processor(s) 1104 may be configured, as described above, to receive the power saving instructions 516 from the power management module 114. The processor(s) 1104 may be configured to transition, as described above, from the first power mode to the second power mode and from the second power mode to the first power mode.

The device 1102 may include one or more input/output (I/O) interface(s) 1106 to allow the processor(s) 1104 or other components of the device 1102 to communicate with various other devices 1102, other computing devices, the server 106, 414, the user device 102, 302, 404, other services, and so on. The I/O interfaces 1106 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 1106 may couple to one or more I/O devices 1108. The I/O devices 1108 may include one or more input devices such as a keyboard, a mouse, a microphone 1108(1), user input buttons 1108(2), and so forth. The I/O devices 1108 may also include output devices such as audio speakers 1108(3), one or more displays 1108(4), and so forth. In some embodiments, the I/O devices 1108 may be physically incorporated within the device 1102, or they may be externally placed. The I/O devices 1108 may include various other devices as well.

The device 1102 may also include one or more communication interfaces 1110. The communication interface(s) 1110 are configured to provide communications with other devices, web-based resources, the server 106, or 414, the user device 102, 302, or 404, other services, routers, wireless access points, and so forth. The communication interfaces 1110 may include wireless functions, devices configured to couple to one or more networks including local area networks (LANs), wireless LANs, wide area networks (WANs), and so forth. The device 1102 may also include one or more busses or other internal communications hardware or software that allow for the transfer of data between the various modules and components of the device 1102.

The device 1102 includes one or more memories 1112. The memory 1112 comprises one or more computer-readable storage media (CRSM). The memory 1112 provides storage of computer readable instructions, which enables the user device 102, 302, and 404, to present the user interface, the one or more elements associated with the network response at the corresponding recommended resolution, data structures, program modules, and other data used during the operation of the user device 102, 302, and 404, or the server 106 and 414. The memory 1112 may include at least one operating system (OS) module 1114. Respective OS modules 1114 are configured to manage hardware devices such as the I/O interface(s) 1106, the I/O devices 1108, the communication interface(s) 1110, and provide various services to applications or modules executing on the processors 1104.

Also, stored in the memory 1112 may be one or more of the following modules. These modules may be executed as foreground applications, background tasks, daemons, and so forth. A presentation module 1116 may be configured to present the user interface, the one or more elements associated with the network response at the corresponding recommended resolution, data structures, program modules, and so forth.

The memory 1112 may also include the crowdsource module 108. The crowdsource module 108 may be configured to in response to receiving the response data 104, generating crowdsource data 110. The crowdsource data 110 may be based on the response data 104. For example, the crowdsource data 110 may include, as described above, the URI 110(1), the location 110(2), the network 110(3), the response time 110(4), the request application 110(5), and so forth. The crowdsource module 108 may be configured to determine, as described above, the filtered crowdsource data 122 to include at least the crowdsource data 110 associated with the applications that have pending network requests and the one or more parameters associated with the user device 102. For example, the crowdsource module 108 may filter the crowdsource data 110 to include data of similar user devices located in Seattle, using a 4G network, and network response times associated with the music, news, and social media applications.

The memory 1112 may also include the prioritization module 112. The prioritization module 112, as described above, may be configured to receive one or more network requests from one or more applications. The prioritization module 112 may be configured to store the network requests in the unordered network request queue 118. The unordered network request queue 118, as described above, may store and indicate a number of network requests from a number of applications or web page requests. For example, the unordered network request queue 118 may store network requests associated with the music application, the news application, the social media application, and so forth. The prioritization module 112 may include the network request determination 124. The network request determination 124, as described above, may be configured to determine a prioritized order to send the network requests stored in the unordered network request queue 118. For example, as described above, the network request determination 124 may determine that the network request associated with the music application be sent first, the social media application be sent second, and the news application be sent third. The prioritization module 112 may include the ordered network request queue 126. The ordered network request queue 126, as described above, may indicate and store the determined prioritized order to send the network application requests to the server 106. For example, the ordered network request queue 126 may store the network request associated with the music application first, the social media application second, the news application third, and so forth.

The memory 1112 may also include the power management module 114. The power management module 114, as described above, may be configured to transition one or more components of the user device 102 from the first power mode to the second power mode. For example, in response to sending a network request the power management module 114 may transition the processor(s) 1104 from the first power mode to the second power mode, as described above.

The memory 1112 may also include the network management module 116. The network management module 116, as described above, may determine an estimated total channel throughput. The estimated total channel throughput may be used to determine a resolution to download one or more elements associated with the application or web service. The network management module 116 may determine the estimated total channel throughput by measuring traffic data indicative of total channel throughput for a network that the user device 102 is using. For example, the user device 102 may be using a Wi-Fi network. The network management module 116 may determine that the estimated total channel throughput to be poor, as described above. The network management module 116 may provide a recommended lower resolution for images and videos.

The memory 1112 may also include the crowdsource determination module 316. The crowdsource determination module 316, as described above, may be configured to filter the crowdsource data 110 to correspond the one or more parameters. For example, the crowdsource determination module 316 may filter the crowdsource data 110 to include data of similar user devices located within the limits of zip code 98108, using a 4G network, and network response times associated with the music, news, and social media applications. The crowdsource determination module 316 may send filtered crowdsource data 318 to the crowdsource module 312. The crowdsource module 312 may send the filtered crowdsource data 318 to the user device 302.

The memory 1112 may also include the network data module 326. The network data module 326, as described above, may be configured to send a network response that corresponds with the network request 324. For example, the network request 324 may correspond to the social media application network request. The network data module 326 may access network response data that is associated with the request, such as images and videos to be included in a social media feed. The network data module 326 may be configured to send the network response to the user device 302. The user device 302 upon receipt of the network response may be configured to present one or more elements associated with the response. For example, the user device 302 may present the images and videos to be included in the social media feed of the social media application.

The memory 1112 may also include a datastore 1118 to store information. The datastore 1118 may use a flat file, database, linked list, tree, executable code, or other data structure to store the information. In some implementations, the datastore 1118 or a portion of the datastore 1118 may be distributed across one or more user devices 102, 302, or 404, or computing devices including the server 106, or 414, network attached storage apparatus, and so forth.

The datastore 1118 may store the crowdsource data 110, the request crowdsource data 120, the filtered crowdsource data 122, the quality data 128, the network response data 132, the network request information 314, or a combination thereof. As described above, the crowdsource data 110 may be based on the response data 104. For example, the crowdsource data 110 may include the URI 110(1), the location 110(2), the network 110(3), the response time 110(4), the request application 110(5), and so forth.

In one implementation, the request crowdsource data 120, as described above, may include one or more parameters. The one or more parameters may include a location of the user device 102, a network, applications seeking to send a network request, and so forth. For example, the one or more parameters may indicate that the user device 102 is located in Seattle, using a 4G network, and has a music, news, and social media application seeking to send a network request.

In another implementation, the filtered crowdsource data 122, as described above, may include at least crowdsource data 110 associated with the applications that have the pending network request and the one or more parameters associated with the user device 102. For example, the crowdsource module 108 may filter the crowdsource data 110 to include data of similar user devices located in Seattle, using a 4G network, and network response times associated with the music, news, and social media applications.

In other implementations, the quality data 128, as described above, may indicate a recommended resolution for images, videos, and so forth. The network response data 132, as described above, may include images and videos at a resolution that corresponds to the quality data 128. The network request information 314, as described above, may include the one or more parameters included in the request crowdsource data 308.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

What is claimed is:

1. A user device comprising:
a hardware processor that executes instructions to:
receive a first network application request from a first application;
receive a second network application request from a second application;
send a request with a parameter to a server for crowdsource data;
receive the crowdsource data that is based on response times to previous network application requests for a second user device, the previous network application requests are associated with the first network application request and the second network application request;
determine a first estimated response time for the first network application request based on the crowdsource data;
determine a second estimated response time for the second network application request based on the crowdsource data, the second estimated response time is less than the first estimated response time;
determine a prioritized order to send the first network application request and the second network application request based on the first estimated response time and the second estimated response time;
based on the prioritized order, send the second network application request before the first network application request; and
in response to receiving a network response associated with the second network application request, send the first network application request.

2. The user device of claim 1, wherein the hardware processor is further configured to execute instructions to:
in response to sending the second network application request, transition the user device from a first power mode to a second power mode, wherein the second power mode consumes less power than the first power mode;
receive the network response associated with the second network application request; and
in response to receiving the network response, transition the user device from the second power mode to the first power mode.

3. The user device of claim 1, wherein the hardware processor is further configured to execute instructions to:
measure traffic data indicative of total channel throughput for a network that the user device is using;
apply a first weight value to the traffic data to determine a first measurement;
apply a second weight value to at least a portion of the crowdsource data to determine a second measurement;
combine the first measurement and the second measurement to determine an estimated total channel throughput for the network that the user device is using;
based on the estimated total channel throughput, determine a recommended resolution of one or more elements associated with the second application to be presented on a display device associated with the user device; and
receive the one or more elements associated with the second application that correspond to the recommended resolution.

4. A method comprising:
receiving first data that is based on network response times to a plurality of network application requests, wherein the network response times are associated with one or more parameters that indicate information associated with a plurality of user devices during which the plurality of network application requests were sent;
determining estimated response times for individual ones of a plurality of network requests associated with a plurality of applications on a user device;
based on the estimated response times, determining an order to send the plurality of network requests; and
sending, in the determined order, the plurality of network requests.

5. The method of claim 4, wherein the one or more parameters comprises one or more of:
uniform resource identifier (URI) information indicative of an address to a resource on the internet,
location information of a user device from where a network request occurred,
network information indicative of a wireless telecommunication technology,
network response time information indicative of a response time associated with an application operating on a second user device, total channel throughput information indicative of an amount of data being transmitted in a fixed amount of time associated with the network information and the location information, application information indicative of a type of software that is configured to enable a user device to execute one or more tasks, or user device information indicative of a type of user device.

6. The method of claim 4, further comprising:

determining that the user device has moved from a first location to a second location;

sending a request for second data;

receiving the second data that is based on network response times to a plurality of network application requests from a plurality of user devices that correspond to the second location;

determining an estimated response time for the individual ones of the plurality of network requests associated with the plurality of applications on the user device;

based on the estimated response times, determining an order to send the individual ones of the plurality of network requests; and sending in the determined order the plurality of network requests.

7. The method of claim 4, wherein determining the estimated response times for the individual ones of the plurality of network requests associated with the plurality of applications on the user device further comprising:

determining a network for individual ones of the network response times for the individual ones of the plurality of network requests;

determining which of the networks for the individual ones of the network response times has the lowest estimated response time; and wherein sending, in the determined order, the plurality of network requests is based on the network that has the lowest estimated response time.

8. The method of claim 4, further comprising:

after sending the plurality of networks requests, transitioning from a first power mode to a second power mode, wherein the second power mode consumes less power than the first power mode;

receiving a network response associated with at least one of the plurality network requests; and transitioning from the second power mode to the first power mode.

9. The method of claim 4, further comprising:

measuring traffic data indicative of real time total channel throughput for a network;

applying a first weight value to the traffic data to determine a first measurement;

applying a second weight value to at least a portion of the first data to determine a second measurement;

combining the first measurement and the second measurement for determining an estimated total channel throughput; and based on the estimated total channel throughput, determining a recommended resolution of one or more elements associated with at least one of the plurality of applications.

10. The method of claim 4, further comprising:

receiving a network response associated with the at least one of the plurality network requests;

determining a network response time associated with the network response; and sending the network response time and the one or more parameters associated with the sending of the network request to a server to be included in generating second data.

11. A system comprising:

a user device comprising:

a hardware processor that executes instructions to:

access first data that is based on network response times to a plurality of network application requests, the network response times are associated with one or more parameters that indicate information associated with a plurality of user devices during which the plurality of network application requests were sent;

determine an estimated network response time for individual network requests associated with an application on the user device;

based on the estimated network response times, determine an order to send individual ones of the network requests; and send the network request that corresponds to the estimated network response time that is lowest.

12. The system of claim 11, wherein the hardware processor is further configured to execute instructions to:

after sending the network request, transition from a first power mode to a second power mode, wherein the second power mode consumes less power than the first power mode;

receive a network response associated with the network request; and in response to receiving the network response, transition from the second power mode to the first power mode.

13. The system of claim 11, wherein the hardware processor is further configured to execute instructions to:

measure traffic data indicative of real time total channel throughput for a network that the user device is using;

apply a first weight value to the traffic data to determine a first measurement;

apply a second weight value to at least a portion of the first data to determine a second measurement;

combine the first measurement and the second measurement to determine an estimated total channel throughput;

based on the estimated total channel throughput, determine a resolution of one or more elements associated with a network response; and receive the one or more elements associated with the network response.

14. The system of claim 11, wherein the hardware processor further executes instructions to:

determine a network for individual ones of the estimated network response times for the network requests;

determine the network that has a lowest estimated response time; and present a user interface indicative of a request to enable the user device to switch between networks to send the network requests.

15. The system of claim 11, further comprising:

a server comprising:

a hardware processor that executes instructions to:

receive network response data from a plurality of user devices, the network response data includes the one or more parameters associated with a network request and a response time for receiving a network response;

generate the first data based on the network response data;

receive a request for the first data, the request includes at least one or more parameters associated with the user device and a list of applications that have a pending network request;

determine filtered first data to include at least first data associated with applications from the list of applications that have the pending network request and the one or more parameters associated with the user device; and send the filtered first data to the user device.

16. The system of claim 15, wherein the filtered first data includes responses times for a network that the user device is currently using and networks that are available to the user device.

17. The system of claim 11, wherein the hardware processor further executes instructions to:

determine a network for individual ones of the estimated network response times for the network requests;

determine the network that has a lowest estimated response time; and wherein sending the network request uses the network that has the lowest estimated response time.

18. The system of claim 11, wherein the hardware processor further executes instructions to:

receive a network response associated with the network request;

determine a network response time associated with the network response; and send the network response time and the one or more parameters associated with the sending of the network request to a server.

19. The system of claim 18, further comprising:

the server comprising:

a hardware processor that executes instructions to:

in response to receiving the network response time and the one or more parameters associated with the sending of the network request, generate second data to include network response data and the associated one or more parameters;

receive a request for the second data, the request includes at least one or more parameters associated with the user device and a list of applications that have a pending network request;

based on the second data, determine third data to include at least second data associated with the applications that have the pending network request and the one or more parameters associated with the user device; and send the third data to the user device.

20. The system of claim 11, wherein the hardware processor further executes instructions to:

determine that the user device has moved a threshold distance from a location of the network request;

send a request for second data;

receive the second data;

determine an estimated network response time for individual network requests associated with applications on the user device;

based on the estimated network response times, determine an order to send individual ones of the network requests; and send the network request that corresponds to the estimated network response time that is lowest.

* * * * *

UNITED STATES PATENT AND TRADEMARK OFFICE
CERTIFICATE OF CORRECTION

PATENT NO. : 10,469,617 B1  
APPLICATION NO. : 15/710569  
DATED : November 5, 2019  
INVENTOR(S) : Abinash Mahapatra Page 1 of 1

It is certified that error appears in the above-identified patent and that said Letters Patent is hereby corrected as shown below:

In the Claims

Column 27, Claim 10, Line 65:  
Currently Reads: one of the plurality network requests...  
Where it should read: --one of the plurality of network requests--

Column 29, Claim 16, Line 13:  
Currently Reads: includes responses times for a network...  
Where it should read: --includes response times for a network--

Signed and Sealed this  
Twenty-fourth Day of December, 2019

Andrei Iancu  
*Director of the United States Patent and Trademark Office*